United States Patent
Tsuji

(10) Patent No.: US 9,447,255 B2
(45) Date of Patent: Sep. 20, 2016

(54) METHOD FOR PRODUCING RUBBER COMPOSITION

(75) Inventor: Takanori Tsuji, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 114 days.

(21) Appl. No.: 14/118,365

(22) PCT Filed: May 23, 2012

(86) PCT No.: PCT/JP2012/063223
§ 371 (c)(1),
(2), (4) Date: Jan. 9, 2014

(87) PCT Pub. No.: WO2012/161229
PCT Pub. Date: Nov. 29, 2012

(65) Prior Publication Data
US 2014/0187693 A1    Jul. 3, 2014

(30) Foreign Application Priority Data

May 25, 2011  (JP) .................................. 2011-116869

(51) Int. Cl.
| C08L 15/00 | (2006.01) |
|---|---|
| C08K 3/04 | (2006.01) |
| C08K 5/548 | (2006.01) |
| C08K 3/36 | (2006.01) |
| C08K 5/31 | (2006.01) |
| C08K 5/00 | (2006.01) |
| C08K 3/00 | (2006.01) |

(52) U.S. Cl.
CPC ............... *C08K 5/31* (2013.01); *C08K 3/0033* (2013.01); *C08K 3/04* (2013.01); *C08K 3/36* (2013.01); *C08K 5/0025* (2013.01); *C08K 5/548* (2013.01); *C08L 15/00* (2013.01)

(58) Field of Classification Search
CPC ....................................................... C08L 15/00
See application file for complete search history.

(56) References Cited

U.S. PATENT DOCUMENTS

| 5,674,932 | A | * | 10/1997 | Agostini et al. ............... 524/430 |
|---|---|---|---|---|
| 5,990,211 | A | * | 11/1999 | Yano ............................. 524/262 |
| 6,589,293 | B1 | | 7/2003 | Guns et al. |
| 6,765,045 | B1 | | 7/2004 | Daniel et al. |
| 2001/0034389 | A1 | | 10/2001 | Vasseur |
| 2002/0115767 | A1 | | 8/2002 | Cruse et al. |
| 2003/0105242 | A1 | | 6/2003 | Penot |
| 2003/0144394 | A1 | | 7/2003 | Penot et al. |
| 2004/0143044 | A1 | * | 7/2004 | Adams et al. ................ 524/110 |
| 2004/0254301 | A1 | | 12/2004 | Tsukimawashi et al. |
| 2006/0281850 | A1 | * | 12/2006 | Tokunaga et al. ............ 524/493 |
| 2008/0033103 | A1 | | 2/2008 | Kameda et al. |
| 2009/0099325 | A1 | * | 4/2009 | Luo et al. ..................... 526/135 |
| 2010/0048775 | A1 | | 2/2010 | Mihara et al. |
| 2010/0105805 | A1 | * | 4/2010 | Sasaka .......................... 523/150 |
| 2011/0196086 | A1 | * | 8/2011 | Matsushita et al. .......... 524/498 |

FOREIGN PATENT DOCUMENTS

| EP | 1963110 | | 4/2007 |
|---|---|---|---|
| EP | 2213687 | A1 | 8/2010 |
| EP | 2407507 | A1 | 1/2012 |
| EP | 2492286 | A1 | 8/2012 |
| JP | 7-165991 | A | 6/1995 |
| JP | 11-263882 | A | 9/1999 |
| JP | 2002-521515 | A | 7/2002 |
| JP | 2002-521516 | A | 7/2002 |
| JP | 2003-523472 | A | 8/2003 |
| JP | 2003-530443 | A | 10/2003 |
| JP | 2004-149684 | A | 5/2004 |
| JP | 2007-154130 | A | 6/2007 |
| WO | 96/30419 | A1 | 10/1996 |
| WO | 02/48256 | A2 | 6/2002 |
| WO | 2006/028254 | A1 | 3/2006 |
| WO | 2007/120797 | A1 | 10/2007 |
| WO | 2008/102513 | A1 | 8/2008 |
| WO | 2008/123306 | A1 | 10/2008 |

OTHER PUBLICATIONS

International Search Report of PCT/JP2012/063223, dated Aug. 21, 2012.
Extended European Search Report issued Nov. 28, 2014 in corresponding European Patent Application No. 12789789.0.

* cited by examiner

*Primary Examiner* — Brieann R Fink
(74) *Attorney, Agent, or Firm* — Sughrue Mion, PLLC

(57) ABSTRACT

The present invention provides a method for producing a rubber composition containing a rubber component (A) that contains a modified conjugated diene-based polymer obtained by using a modifying agent that has a functional group compatible with silica, a filler containing an inorganic filler (B), a silane coupling agent (C), and at least one promoter (D) selected from guanidines, sulfenamides, thiazoles, thiurams, thioureas, dithiocarbamic acid compounds and xanthogenic acid compounds, wherein the rubber composition is kneaded in plural stages, and in the first stage (X) of kneading, the rubber component (A), all or a part of the inorganic filler (B), all or a part of the silane coupling agent (C) and the promoter (D) are added and kneaded.

30 Claims, No Drawings

METHOD FOR PRODUCING RUBBER COMPOSITION

CROSS REFERENCE TO RELATED APPLICATIONS

This application is a National Stage of International Application No. PCT/JP2012/063223 filed May 23, 2012, claiming priority based on Japanese Patent Application No. 2011-116869, filed May 25, 2011, the contents of all of which are incorporated herein by reference in their entirety.

TECHNICAL FIELD

The present invention relates to a method for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of using an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, PTL 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

PTL 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

PTL 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, PTL 4 proposes a rubber composition basically containing at least (i) a diene elastomer, (ii) an inorganic filler as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

As a case of increasing the activity of the coupling function of a silane coupling agent in consideration of kneading conditions, there is mentioned PTL 5; however, it is desired to further improve the effect of enhancing the activity of the coupling function of a silane coupling agent.

CITATION LIST

Patent Literature

PTL 1: JP-T 2002-521515
PTL 2: JP-T 2002-521516
PTL 3: JP-T 2003-530443
PTL 4: JP-T 2003-523472
PTL 5: WO2008/123306

SUMMARY OF INVENTION

Technical Problem

Given the situation as above, an object of the present invention is to provide a method for producing a rubber composition containing a modified conjugated diene-based polymer, which can further increase the activity of the coupling function of a silane coupling agent to thereby favorably produce a low-heat-generating rubber composition.

Solution to Problem

For solving the above-mentioned problems, the present inventors have made various experiments by incorporating a rubber component containing a modified conjugated diene-based polymer, all or a part of an inorganic filler, all or a part of a silane coupling agent, and at least one promoter selected from guanidines, sulfenamides and thiazoles, and, as a result, have experimentally found that, in order to enhance the activity of the coupling function, it is good to incorporate at least one promoter selected from guanidines, sulfenamides and thiazoles in the first stage of the kneading step, and have completed the present invention.

Specifically, the present invention is:

[1] A method for producing a rubber composition containing a rubber component (A) that contains a modified conjugated diene-based polymer obtained by using a modifying agent that has a functional group compatible with silica, a filler containing an inorganic filler (B), a silane coupling agent (C), and at least one promoter (D) selected from guanidines, sulfenamides, thiazoles, thiurams, thioureas, dithiocarbamic acid compounds and xanthogenic acid compounds, wherein the rubber composition is kneaded in plural stages, and in the first stage (X) of kneading, the rubber component (A), all or a part of the inorganic filler (B), all or apart of the silane coupling agent (C) and the promoter (D) are added and kneaded.

Advantageous Effects of Invention

According to the present invention, there is provided a method for producing a rubber composition containing a modified conjugated diene-based polymer obtained by using a modifying agent that has a functional group compatible with silica, in which the activity of the coupling function of the silane coupling agent used can be further increased to produce a rubber composition excellent in low-heat-generation property.

DESCRIPTION OF EMBODIMENTS

The present invention is described in detail hereinunder.

The method for producing a rubber composition of the present invention is a method for producing a rubber composition containing a rubber component (A) that contains a modified conjugated diene-based polymer obtained by using a modifying agent that has a functional group compatible with silica, a filler containing an inorganic filler (B), a silane coupling agent (C), and at least one promoter (D) selected from guanidines, sulfenamides, thiazoles, thiurams, thioureas, dithiocarbamic acid compounds and xanthogenic acid compounds, wherein the rubber composition is kneaded in plural stages, and in the first stage (X) of kneading, the rubber component (A), all or a part of the inorganic filler (B), all or a part of the silane coupling agent (C) and the promoter (D) are added and kneaded.

In the present invention, the promoter (D) is added and kneaded in the first stage of kneading, and this is for increasing the activity of the coupling function of the silane coupling agent (C).

In the first stage of kneading in the present invention, it is more desirable that, after the rubber component (A), all or a part of the inorganic filler (B) and all or a part of the silane coupling agent (C) have been kneaded, the promoter (D) is added thereto and further kneaded in order that the effect of enhancing the activity of the coupling function through incorporation of the promoter (D) could be prevented from being reduced. This is because, after the reaction between the inorganic filler (B) and the silane coupling agent (C) could be fully attained, the reaction between the silane coupling agent (C) and the rubber component (C) could be attained.

In the first stage of kneading, more preferably, the time taken after the addition of the rubber component (A), all or a part of the inorganic filler (B) and all or a part of the silane coupling agent (C) and until the addition of the promoter (D) during the first stage is from 10 to 180 seconds. The lower limit of the time is more preferably at least 30 seconds, and the upper limit is more preferably at most 150 seconds, even more preferably at most 120 seconds. When the time is at least 10 seconds, the reaction between (B) and (C) can be fully attained. Even though the time is more than 180 seconds, the method could not enjoy any additional effect since the reaction between (B) and (C) would have been fully attained, and therefore it is desirable that the upper limit is at most 180 seconds.

In the present invention, preferably, the molar amount X of the organic acid in the rubber composition in the first stage of kneading satisfies the following relational formula [1] relative to the molar amount Y of the promoter (D). This is for the purpose of favorably preventing the effect of enhancing the activity of the coupling function through incorporation of the promoter (D) from being reduced owing to the presence of a large quantity of the organic acid.

$$0 \leq X \leq 1.5 \times Y \tag{1}$$

For reducing the amount of the organic acid in the first stage (X) of kneading, preferably, the organic acid is added in and after the second stage of kneading.

In the present invention, preferably, the highest temperature of the rubber composition in the first stage of kneading is from 120 to 190° C. This is for sufficiently attaining the reaction between the inorganic filler (B) and the silane coupling agent (C). From this viewpoint, the highest temperature of the rubber composition in the first stage of kneading is more preferably from 130 to 190° C., even more preferably from 140 to 180° C.

The kneading step of the rubber composition in the present invention includes at least two stages of the first stage of kneading where the system does not contain any other vulcanizing agent or the like except the promoter (D) and the final stage of kneading where the system contains a vulcanizing agent, etc., and if desired, the step may further include an intermediate stage of kneading where the system does not contain any other vulcanizing agent or the like except the promoter (D). Here, vulcanizing agent or the like is meant to include a vulcanizing agent and a vulcanization accelerator.

The first stage of kneading in the present invention is the first stage of kneading the rubber component (A), the inorganic filler (B) and the silane coupling agent (C), but not including the case of kneading the rubber component (A) and any other filler than the inorganic filler (B) in the first stage or the case of pre-kneading the rubber component (A) alone.

[Silane Coupling Agent (C)]

The silane coupling agent (C) for use in the rubber composition production method of the present invention is preferably at least one compound selected from a group consisting of compounds of the following general formulae (I) and (II).

Using the silane coupling agent (C) of the type, the rubber composition produced according to the method of the present invention is excellent in workability thereof and can give pneumatic tires having better abrasion resistance.

The general formulae (I) and (II) are sequentially described below.

[Chem. 1]

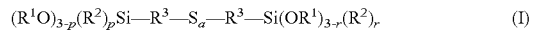

wherein plural $R^1$'s may be the same or different, each representing a linear, cyclic or branched alkyl group, having from 1 to 8 carbon atoms, or a linear or branched alkoxylalkyl group, having from 2 to 8 carbon atoms; plural $R^2$'s may be the same or different, each representing a linear, cyclic or branched alkyl group, having from 1 to 8 carbon atoms; plural $R^3$'s may be the same or different, each representing a linear or branched alkylene group, having from 1 to 8 carbon atoms; a indicates from 2 to 6 as a mean value; p and r may be the same or different, each indicating from 0 to 3 as a mean value, provided that both p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl) tetrasulfide, bis(2-triethoxysilylethyl)tetrasulfide, bis(3-triethoxysilylpropyl)disulfide, bis(3-trimethoxysilylpropyl) disulfide, bis(3-methyldimethoxysilylpropyl)disulfide, bis (2-triethoxysilylethyl)disulfide, bis(3-triethoxysilylpropyl) trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3- monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chem. 2]

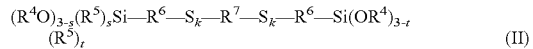

$$(R^4O)_{3-s}(R^5)_sSi—R^6—S_k—R^7—S_k—R^6—Si(OR^4)_{3-t}\\(R^5)_t \quad \text{(II)}$$

wherein plural $R^4$'s may be the same or different, each representing a linear, cyclic or branched alkyl group, having from 1 to 8 carbon atoms, or a linear or branched alkoxylalkyl group, having from 2 to 8 carbon atoms; plural $R^5$'s may be the same or different, each representing a linear, cyclic or branched alkyl group, having from 1 to 8 carbon atoms; plural $R^6$'s may be the same or different, each representing a linear or branched alkylene group, having from 1 to 8 carbon atoms; $R^7$ represents a divalent group of a general formula ($—S—R^8—S—$), ($—R^9—S_{m1}—R^{10}—$) or ($—R^{11}—S_{m2}—R^{12}—S_{m3}—R^{13}—$) (where $R^8$ to $R^{13}$ may be the same or different, each representing a divalent aliphatic hydrocarbon group having from 1 to 20 carbon atoms, a divalent alicyclic hydrocarbon group having from 3 to 20 carbon atoms, a divalent aromatic group, or a divalent organic group containing a hetero element except sulfur and oxygen; m1, m2 and m3 may be the same or different, each indicating from 1 to less than 4 as a mean value); plural k's may be the same or different, each indicating from 1 to 6 as a mean value; s and t may be the same or different, each indicating from 0 to 3 as a mean value, provided that both s and t are not 3 at the same time.

Preferred examples of the silane coupling agent (C) represented by the above-mentioned general formula (II) are compounds represented by an average compositional formula $(CH_3CH_2O)_3Si—(CH_2)_3—S_2—(CH_2)_6—S_2—(CH_2)_3—Si(OCH_2CH_3)_3$, an average compositional formula $(CH_3CH_2O)_3Si—(CH_2)_3—S_2—(CH_2)_6—S_2—(CH_2)_3—Si(OCH_2CH_3)_3$, an average compositional formula $(CH_3CH_2O)_3Si—(CH_2)_3—S_3—(CH_2)_6—S_3—(CH_2)_3—Si(OCH_2CH_3)_3$, an average compositional formula $(CH_3CH_2O)_3Si—(CH_2)_3—S_4—(CH_2)_6—S_4—(CH_2)_3—Si(OCH_2CH_3)_3$, an average compositional formula $(CH_3CH_2O)_3Si—(CH_2)_3—S—(CH_2)_6—S_2—(CH_2)_6—S—(CH_2)_3—Si(OCH_2CH_3)_3$, an average compositional formula $(CH_3CH_2O)_3Si—(CH_2)_3—S—(CH_2)_6—S_{2.5}—(CH_2)_6—S—(CH_2)_3—Si(OCH_2CH_3)_3$, an average compositional formula $(CH_3CH_2O)_3Si—(CH_2)_3—S—(CH_2)_6—S_3—(CH_2)_6—S—(CH_2)_3—Si(OCH_2CH_3)_3$, an average compositional formula $(CH_3CH_2O)_3Si—(CH_2)_3—S—(CH_2)_6—S_4—(CH_2)_6—S—(CH_2)_3—Si(OCH_2CH_3)_3$, an average compositional formula $(CH_3CH_2O)_3Si—(CH_2)_3—S_4—(CH_2)_{10}—S_2—(CH_2)_{10}—S—(CH_2)_3—Si(OCH_2CH_3)_3$, an average compositional formula $(CH_3CH_2O)_3Si—(CH_2)_3—S_4—(CH_2)_6—S_4—(CH_2)_6—S_4—(CH_2)_3—Si(OCH_2CH_3)_3$, an average compositional formula $(CH_3CH_2O)_3Si—(CH_2)_3—S_2—(CH_2)_6—S_2—(CH_2)_6—S_2—(CH_2)_3—Si(OCH_2CH_3)_3$, an average compositional formula $(CH_3CH_2O)_3Si—(CH_2)_3—S—(CH_2)_6—S_2—(CH_2)_6—S_2—(CH_2)_6—S—(CH_2)_3—Si(OCH_2CH_3)_3$, etc.

Examples of synthesis of the silane coupling agent (C) represented by the above-mentioned general formula (II) are described, for example, in WO2004/000930.

Of the compounds represented by the above-mentioned general formulae (I) and (II), those represented by the general formula (I) are especially preferred as the silane coupling agent (C) for use in the present invention. This is because the promoter (D) can readily activate the polysulfide bond that reacts with the rubber component (A).

In the present invention, one alone or two or more different types of the silane coupling agents (C) may be used either singly or as combined.

The amount of the silane coupling agent (C) to be in the rubber composition in the present invention is preferably from 1 to 20% by mass of the inorganic filler. When the amount is less than 1% by mass, then the rubber composition could hardly exhibit the effect of enhancing the low-heat-generation property thereof; and when more than 20% by mass, then the cost of the rubber composition would be too high and the economic potential thereof would lower. Further, the amount is more preferably from 3 to 20% by mass of the inorganic filler, even more preferably from 4 to 10% by mass of the inorganic filler.

[Promoter (D)]

The promoter (D) for use in the rubber composition production method of the present invention includes guanidines, sulfenamides, thiazoles, thiurams, thioureas, dithiocarbamic acid compounds and xanthogenic acid compounds.

The guanidines include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, 1,3-di-o-cumenyl-2-propionylguanidine, etc. Preferred are 1,3-diphenylguanidine, 1,3-di-o-tolylguanidine and 1-o-tolylbiguanide as having high reactivity; and more preferred is 1,3-diphenylguanidine as having higher reactivity.

The sulfenamides for use in the rubber composition production method of the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-dipentyl-2-benzothiazolylsulfenamide, N,N-dioctyl-2-benzothiazolylsulfenamide, N,N-di-2-ethylhexylbenzothiazolylsulfenamide, N-decyl-2-benzothiazolylsulfenamide, N,N-didodecyl-2-benzothiazolylsulfenamide, N,N-distearyl-2-benzothiazolylsulfenamide, etc. Of those, preferred are N-cyclohexyl-2-benzothiazolylsulfenamide and N-tert-butyl-2-benzothiazolylsulfenamide, as having high reactivity.

The thiazoles for use in the rubber composition production method of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole, etc. Of those, preferred are 2-mercaptobenzothiazole and di-2-benzothiazolyl disulfide, as having high reactivity.

The thiurams for use in the rubber composition production method of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monosulfide, tetranonylthiurammonosulfide, tetradecylthiuram monosulfide, tetradodecylthiuram monosulfide, tetrastearylthiuram monosulfide, tetrabenzylthiuram monosulfide, dipentamethylthiuram tetrasulfide, etc. Of those, preferred are tetrakis(2-ethylhexyl) thiuram disulfide and tetrabenzylthiuram disulfide, as having high reactivity.

The thioureas for use in the rubber composition production method of the present invention include N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, etc. Of those, preferred are N,N'-diethylthiourea, trimethylthiourea, N,N'-diphenylthiourea and N,N'-dimethylthiourea, as having high reactivity.

The dithiocarbamate salts for use in the rubber composition production method of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pent amethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pent amethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, etc. Of those, preferred are zinc dibenzyldithiocarbamate, zinc N-ethyl-N-phenyldithiocarbamate, zinc dimethyldithiocarbamate and copper dimethyldithiocarbamate, as having high reactivity.

The xanthate salts for use in the rubber composition production method of the present invention include zinc methylxanthate, zinc ethylxanthate, zinc propylxanthate, zinc isopropylxanthate, zinc butylxanthate, zinc pentylxanthate, zinc hexylxanthate, zinc heptylxanthate, zinc octylxanthate, zinc 2-ethylhexylxanthate, zinc decylxanthate, zinc dodecylxanthate, potassium methylxanthate, potassium ethylxanthate, potassium propylxanthate, potassium isopropylxanthate, potassium butylxanthate, potassium pentylxanthate, potassium hexylxanthate, potassium heptylxanthate, potassium octylxanthate, potassium 2-ethylhexylxanthate, potassium decylxanthate, potassium dodecylxanthate, sodium methylxanthate, sodium ethylxanthate, sodium propylxanthate, sodium isopropylxanthate, sodium butylxanthate, sodium pentylxanthate, sodium hexylxanthate, sodium heptylxanthate, sodium octylxanthate, sodium 2-ethylhexylxanthate, sodium decylxanthate, sodium dodecylxanthate, etc. Of those, preferred is zinc isopropylxanthate, as having high reactivity.

In the first aspect of the present invention, the molar amount of the promoter (D) in the rubber composition in the first stage of kneading is preferably from 0.1 to 1.0 times the molar amount of the silane coupling agent (C). When the amount is at least 0.1 times, the silane coupling agent (C) could be sufficiently activated; and when at most 1.0 time, the promoter would not have any significant influence on the vulcanization rate. More preferably, the number of molecules (molar number) of the promoter (D) is from 0.3 to 1.0 time the number of molecules (molar number) of the silane coupling agent (C).

The promoter (D) may serve also as an accelerator for sulfur vulcanization, and therefore a desired amount of the promoter may also be incorporated in the final stage of kneading.

[Rubber Component (A)]

The rubber component (A) for use in the rubber composition production method of the present invention contains a modified conjugated diene-based polymer obtained by using a modifying agent that contains at least one selected from a silicon atom, a nitrogen atom and an oxygen atom.

The modified conjugated diene-based polymer may be a modified conjugated diene copolymer or a modified conjugated diene homopolymer. The modified conjugated diene copolymer may be a modified aromatic vinyl-conjugated diene copolymer or a copolymer of plural conjugated dienes.

The polymerization method may be any of anionic polymerization, coordination polymerization or emulsion polymerization. The modifying agent may be a modifying agent that reacts with the polymerization-active terminal in anionic polymerization or coordination polymerization, or may also be the amide moiety of a lithium amide compound to be used as a polymerization initiator. In emulsion polymerization, the modifying agent may be copolymerized as a monomer that contains at least one selected from a silicon atom, a nitrogen atom and an oxygen atom.

Preferred examples of the modifying agent for use in the present invention are mentioned below.

The modifying agent for use for modification to give the modified conjugated diene-based polymer in the present invention is a modifying agent that has a functional group compatible with silica. Preferably, the modifying agent is a modifying agent having at least one atom selected from a silicon atom, a nitrogen atom and an oxygen atom. Specifically, the functional group compatible with silica is preferably one having at least one atom selected from a silicon atom, a nitrogen atom and an oxygen atom. This is because the functional group having any of a silicon atom, a nitrogen atom and an oxygen atom is compatible with silica.

From the viewpoint of having compatibility with silica, the modifying agent for use in the present invention is more preferably a hydrocarbyloxysilane compound.

The hydrocarbyloxysilane compound for use in the present invention is preferably a hydrocarbyloxysilane compound represented by the following general formula (III):

[Chem. 3]

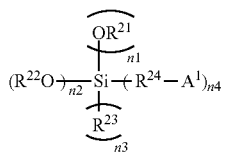

(III)

In the above-mentioned general formula (III), n1+n2+n3+n4=4 (wherein n2 is an integer of from 1 to 4, and n1, n3 and n4 each are an integer of from 0 to 3); $A^1$ represents at least one functional group selected from a saturated cyclic tertiary amine compound residue, an unsaturated cyclic tertiary amine compound residue, a ketimine residue, a nitrile group, a (thio)isocyanate group, a (thio)epoxy group, a trihydrocarbyl isocyanurate group, a dihydrocarbyl carbonate group, a nitrile group, a pyridine group, a (thio)ketone)ketone group, a (thio)aldehyde group, an amide group, a (thio)carboxylate group, a (thio)carboxylate metal salt group, a carboxylic acid anhydride residue, a carboxylic acid halide residue, and a hydrolysable group-having, primary or secondary amino group or mercapto group. When n4 is 2 or more, then $A^1$'s may be the same or different, $A^1$ may bond to Si to be a divalent group that forms a cyclic structure. $R^{21}$ represents a monovalent aliphatic or alicyclic hydrocarbon group, having from 1 to 20 carbon atoms, or a monovalent aromatic hydrocarbon group having from 6 to 18 carbon atoms. When n1 is 2 or more, then $R^{21}$'s may be the same or different. $R^{23}$ represents a monovalent aliphatic or alicyclic hydrocarbon group, having from 1 to 20 carbon atoms, a monovalent aromatic hydrocarbon group having from 6 to 18 carbon atoms, or a halogen atom (fluorine, chlorine, bromine, iodine). When n3 is 2 or more, then $R^{23}$'s may be the same or different. $R^{22}$ represents a monovalent aliphatic or alicyclic hydrocarbon group, having from 1 to 20 carbon atoms or a monovalent aromatic hydrocarbon group having from 6 to 18 carbon atoms, optionally having a nitrogen atom and/or a silicon atom. When n2 is 2 or more, then $R^{22}$'s may be the same or different, or may bond to each other to form a ring. $R^{24}$ represents a divalent aliphatic or alicyclic hydrocarbon group, having from 1 to 20 carbon atoms, or a divalent aromatic hydrocarbon group having from 6 to 18 carbon atoms. When n4 is 2 or more, then $R^{24}$'s may be the same or different.

The hydrolysable group in the hydrolysable group-having, primary or secondary amino group or the hydrolysable group-having mercapto group is preferably a trimethylsilyl group or a tert-butyldimethylsilyl group, more preferably a trimethylsilyl group.

In the present invention, "monovalent aliphatic or alicyclic hydrocarbon group, having from 1 to 20 carbon atoms" means "monovalent aliphatic hydrocarbon group having from 1 to 20 carbon atoms, or monovalent alicyclic hydrocarbon group having from 3 to 20 carbon atoms". The same shall apply to the divalent hydrocarbon group.

More preferably, the hydrocarbyloxysilane compound represented by the above-mentioned general formula (III) is a hydrocarbyloxysilane compound represented by the following general formula (IV):

[Chem. 4]

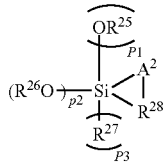

(IV)

In the above-mentioned general formula (IV), p1+p2+p3=2 (wherein p2 is an integer of from 1 to 2, and p1 and p3 each are an integer of from 0 to 1); $A^2$ represents $NR^a$ (where $R^a$ represents a monovalent hydrocarbon group, a hydrolysable group or a nitrogen-containing organic group; and the hydrolysable group is preferably a trimethylsilyl group or a tert-butyldimethylsilyl group, more preferably a trimethylsilyl group), or a sulfur; $R^{25}$ represents a monovalent aliphatic or alicyclic hydrocarbon group, having from 1 to 20 carbon atoms, or a monovalent aromatic hydrocarbon group having from 6 to 18 carbon atoms; $R^{27}$ represents a monovalent aliphatic or alicyclic hydrocarbon group, having from 1 to 20 carbon atoms, a monovalent aromatic hydrocarbon group having from 6 to 18 carbon atoms, or a halogen atom (fluorine, chlorine, bromine, iodine); $R^{26}$ represents a monovalent aliphatic or alicyclic hydrocarbon group, having from 1 to 20 carbon atoms, a monovalent aromatic hydrocarbon group having from 6 to 18 carbon atoms or a nitrogen-containing organic group, optionally having a nitrogen atom and/or a silicon atom. When p2 is 2, then $R^{26}$'s may be the same or different, or may bond to each other to form a ring. $R^{28}$ represents a divalent aliphatic or alicyclic hydrocarbon group, having from 1 to 20 carbon atoms, or a divalent aromatic hydrocarbon group having from 6 to 18 carbon atoms.

Further, the hydrocarbyloxysilane compound represented by the above-mentioned general formula (III) is more preferably a hydrocarbyloxysilane compound represented by the following general formula (V) or (VI):

[Chem. 5]

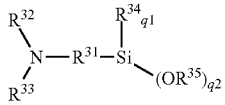

(V)

In the above-mentioned general formula (V), q1+q2=3 (where q1 is an integer of from 0 to 2, and q2 is an integer of from 1 to 3); $R^{31}$ represents a divalent aliphatic or alicyclic hydrocarbon group, having from 1 to 20 carbon atoms, or a divalent aromatic hydrocarbon group having from 6 to 18 carbon atoms; $R^{32}$ and $R^{33}$ each independently represent a hydrolysable group, a monovalent aliphatic or alicyclic hydrocarbon group, having from 1 to 20 carbon atoms, or a monovalent aromatic hydrocarbon group having from 6 to 18 carbon atoms; $R^{34}$ represents a monovalent aliphatic or alicyclic hydrocarbon group, having from 1 to 20 carbon atoms, or a monovalent aromatic hydrocarbon group having from 6 to 18 carbon atoms. When q1 is 2, then $R^{34}$'s may be the same or different. $R^{35}$ represents a monovalent aliphatic or alicyclic hydrocarbon group, having from 1 to 20 carbon atoms, or a monovalent aromatic hydrocarbon group having from 6 to 18 carbon atoms. When q2 is 2 or more, then $R^{35}$'s may be the same or different.

[Chem. 6]

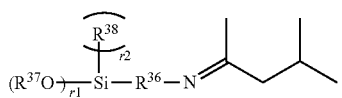

(VI)

In the above-mentioned general formula (VI), r1+r2=3 (where r1 is an integer of from 1 to 3, r2 is an integer of from 0 to 2); $R^{36}$ represents a divalent aliphatic or alicyclic hydrocarbon group, having from 1 to 20 carbon atoms, or a divalent aromatic hydrocarbon group having from 6 to 18 carbon atoms; $R^{37}$ represents a dimethylaminomethyl group, a dimethylaminoethyl group, a diethylaminomethyl group, a diethylaminoethyl group, a methylsilyl(methyl)aminomethyl group, a methylsilyl(methyl)aminoethyl group, a methylsilyl(ethyl)aminomethyl group, a methylsilyl(ethyl) aminoethyl group, a dimethylsilylaminomethyl group, a dimethylsilylaminoethyl group, a monovalent aliphatic or alicyclic hydrocarbon group, having from 1 to 20 carbon atoms, or a monovalent aromatic hydrocarbon group having from 6 to 18 carbon atoms. When r1 is 2 or more, then $R^{37}$'s may be the same or different. $R^{38}$ represents a hydrocarbyloxy group having from 1 to 20 carbon atoms, a monovalent aliphatic or alicyclic hydrocarbon group, having from 1 to 20 carbon atoms, or a monovalent aromatic hydrocarbon group having from 6 to 18 carbon atoms. When r2 is 2, then $R^{38}$'s may be the same or different.

Preferably, the modifying agent is a hydrocarbyloxysilane compound having two or more nitrogen atoms and represented by the following general formula (VII) or (VIII):

[Chem. 7]

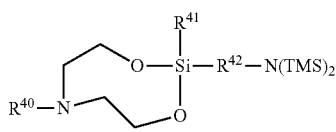

(VII)

In the above-mentioned general formula (VII), TMS represents a trimethylsilyl group; $R^{40}$ represents a trimethylsilyl group, a monovalent aliphatic or alicyclic hydrocarbon group, having from 1 to 20 carbon atoms, or a monovalent aromatic hydrocarbon group having from 6 to 18 carbon atoms; $R^{41}$ represents a hydrocarbyloxy group having from 1 to 20 carbon atoms, a monovalent aliphatic or alicyclic hydrocarbon group, having from 1 to 20 carbon atoms, or a monovalent aromatic hydrocarbon group having from 6 to 18 carbon atoms; $R^{42}$ represents a divalent aliphatic or alicyclic hydrocarbon group, having from 1 to 20 carbon atoms, or a divalent aromatic hydrocarbon group having from 6 to 18 carbon atoms.

[Chem. 8]

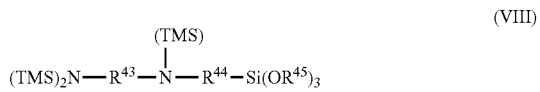

(VIII)

In the above-mentioned general formula (VIII), TMS represents a trimethylsilyl group; $R^{43}$ and $R^{44}$ each independently represent a divalent aliphatic or alicyclic hydrocarbon group, having from 1 to 20 carbon atoms, or a divalent aromatic hydrocarbon group having from 6 to 18 carbon atoms; $R^{45}$ represents a monovalent aliphatic or alicyclic hydrocarbon group, having from 1 to 20 carbon atoms, or a monovalent aromatic hydrocarbon group having from 6 to 18 carbon atoms, and plural $R^{45}$'s may be the same or different.

Also preferably, the hydrocarbyloxysilane compound represented by the general formula (III) is a hydrocarbyloxysilane compound represented by the following general formula (IX):

[Chem. 9]

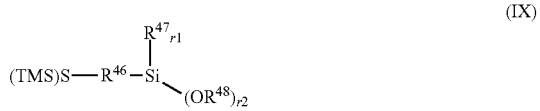

(IX)

In the above-mentioned general formula (IX), r1+r2=3 (wherein r1 is an integer of from 0 to 2, and r2 is an integer of from 1 to 3); TMS represents a trimethylsilyl group; $R^{46}$ represents a divalent aliphatic or alicyclic hydrocarbon group, having from 1 to 20 carbon atoms, or a divalent aromatic hydrocarbon group having from 6 to 18 carbon atoms; $R^{47}$ and $R^{48}$ each independently represent a monovalent aliphatic or alicyclic hydrocarbon group, having from 1 to 20 carbon atoms, or a monovalent aromatic hydrocarbon group having from 6 to 18 carbon atoms, and plural $R^{47}$'s and $R^{48}$'s may be the same or different.

Further, the modifying agent is preferably a hydrocarbyloxysilane compound represented by the following general formula (X):

[Chem. 10]

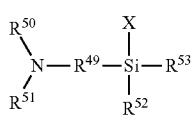

(X)

In the above-mentioned general formula (X), X represents a halogen atom; $R^{49}$ represents a divalent aliphatic or alicyclic hydrocarbon group, having from 1 to 20 carbon atoms, or a divalent aromatic hydrocarbon group having from 6 to 18 carbon atoms; $R^{50}$ and $R^{51}$ each independently represent a hydrolysable group, or a monovalent aliphatic or alicyclic hydrocarbon group, having from 1 to 20 carbon atoms, or a monovalent aromatic hydrocarbon group having from 6 to 18 carbon atoms, or $R^{50}$ and $R^{51}$ bond to each other to form a divalent organic group; $R^{52}$ and $R^{53}$ each independently represent a halogen atom, a hydrocarbyloxy group, or a monovalent aliphatic or alicyclic hydrocarbon group, having from 1 to 20 carbon atoms, or a monovalent aromatic hydrocarbon group having from 6 to 18 carbon atoms. Preferably, $R^{50}$ and $R^{51}$ each are a hydrolysable group; and as the hydrolysable group, more preferred is a trimethylsilyl group or a tert-butyldimethylsilyl group, and even more preferred is a trimethylsilyl group.

The hydrocarbyloxysilane compound represented by the above-mentioned general formulae (III) to (X) is preferably used as the modifying agent in producing the modified conjugated diene-based polymer for use in the present invention, through anionic polymerization.

Also preferably, the hydrocarbyloxysilane compound represented by the above-mentioned general formulae (III) to (X) is an alkoxysilane compound.

As the modifying agent to be preferably used for modification to give the modified conjugated diene-based polymer produced through anionic polymerization, preferred is at least one compound selected from 3,4-bis(trimethylsilyloxy)benzaldehyde, 3,4-bis(tert-butyldimethylsilyloxy)benzaldehyde, 2-cyanopyridine, 1,3-dimethyl-2-imidazolidinone and 1-methyl-2-pyrrolidone.

Preferably, the modifying agent for use in the present invention is the amide moiety of a lithium amide compound to be used as a polymerization initiator in anionic polymerization.

Preferably, the lithium amide compound is selected from lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperadide, lithium ethylpropylamide, lithium ethylbutylamide, lithium ethylbenzylamide and lithium methylphenethylamide. For example, the amide moiety of lithium hexamethyleneimide to be the modifying agent is hexamethyleneimine; and the amide moiety of lithium pyrrolidide to be the modifying agent is pyrrolidine; and the amide moiety of lithium piperidide to be the modifying agent is piperidine.

As the modifying agent preferred for use in the present invention for modification to give the modified conjugated diene-based polymer through coordination polymerization for use in the present invention, preferably mentioned is at least one compound selected from 2-cyanopyridine and 3,4-ditrimethylsilyloxybenzaldehyde.

As the modifying agent preferred for use in the present invention for modification to give the modified conjugated diene-based polymer through emulsion polymerization for use in the present invention, preferably mentioned is at least one compound selected from 3,4-ditrimethylsilyloxybenzaldehyde and 4-hexamethyleneiminoalkylstyrene. The modifying agent preferred for use in emulsion polymerization is preferably copolymerized as a monomer that contains a nitrogen atom and/or a silicon atom, during emulsion polymerization.

In case of anionic polymerization, the modified conjugated diene-based polymer in the present invention is preferably a modified anionically-polymerized aromatic vinyl-butadiene copolymer or a modified anionically-polymerized polybutadiene (hereinafter this may be abbreviated as "modified anionically-polymerized BR"); and as the modified anionically-polymerized aromatic vinyl-butadiene copolymer, preferred is a modified anionically-polymerized styrene-butadiene copolymer (hereinafter this may be abbreviated as "modified anionically-polymerized SBR").

In case of coordination polymerization, also preferred is a modified coordination-polymerized polybutadiene (hereinafter this may be abbreviated as "modified coordination-polymerized BR").

Further in case of emulsion polymerization, preferred is a modified emulsion-polymerized aromatic vinyl-butadiene copolymer; and as the modified emulsion-polymerized aromatic vinyl-butadiene copolymer, preferred is a modified emulsion-polymerized styrene-butadiene copolymer (hereinafter this may be referred to as "modified emulsion-polymerized SBR").

In any case of the above-mentioned anionic polymerization, coordination polymerization and emulsion polymerization, any known polymerization method and any known modification method are usable.

The rubber component (A) in the present invention may comprise at least one modified conjugated diene-based polymer of the above-mentioned, modified conjugated diene-based polymers, or may contain natural rubber and/or any other synthetic diene-based rubber in addition to at least one modified conjugated diene-based polymer of the above-mentioned, modified conjugated diene-based polymers.

As the other synthetic diene-based rubber, usable here are a non-modified solution-polymerized styrene-butadiene copolymer rubber (hereinafter this may be referred to as "non-modified solution-polymerized SBR"), an emulsion-polymerized styrene-butadiene copolymer rubber (hereinafter this may be referred to as "emulsion-polymerized SBR"), a non-modified polybutadiene rubber (non-modified BR), a polyisoprene rubber (IR), a butyl rubber (IIR), an ethylene-propylene-diene tercopolymer rubber (EPDM), etc. One alone or two or more different types of natural rubbers and other diene-based rubbers may be used here either singly or as combined.

[Organic Acid]

Examples of the organic acid for use in the present invention includes saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linolic acid, linolenic acid, nervonic acid, etc.; as well as resin acids such as rosin acid, modified rosin acid, etc.

In the present invention, preferably, 50 mol % or more of the organic acid is stearic acid, in order that the compound must fully exhibit the function as a vulcanization promoter aid.

At most 50 mol % of the organic acid may be rosin acid (including modified rosin acid) and/or fatty acid contained in emulsion-polymerized styrene-butadiene copolymer.

[Inorganic Filler (B)]

As the inorganic filler (B) for use in the rubber composition production method of the present invention, usable are silica and an inorganic compound represented by the following general formula (XI):

$$dM^1 \cdot xSiO_y \cdot zH_2O \qquad (XI)$$

In the general formula (XI), $M^1$ represents at least one selected from a metal selected from aluminium, magnesium, titanium, calcium and zirconium, and oxides or hydroxides of those metals, their hydrates, or carbonates of the metals; d, x, y and z each indicate an integer of from 1 to 5, an integer of from 0 to 10, an integer of from 2 to 5, and an integer of from 0 to 10, respectively.

In the general formula (XI), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable here; and above all, preferred is wet silica, dry silica or colloidal silica, and more preferred is wet silica. Preferably, the BET specific surface area (as measured according to ISO 5794/1) of silica for use herein is from 40 to 350 $m^2/g$. Silica of which the BET specific surface area falls within the range is advantageous in that it satisfies both rubber-reinforcing capability and dispersibility in rubber component. From this viewpoint, silica of which the BET specific surface area falls within a range of from 80 to 350 $m^2/g$ is more preferred, and silica of which the BET specific surface area falls within a range of from 120 $m^2/g$ to 350 $m^2/g$ is even more preferred. As silicas of those types, usable here are commercial products of Tosoh Silica's trade names "Nipsil AQ" (BET specific surface area=220 $m^2/g$) and "Nipsil KQ", Degussa's trade name "Ultrasil VN3" (BET specific surface area=175 $m^2/g$), etc.

As the inorganic compound represented by the general formula (XI), usable here are alumina ($Al_2O_3$) such as γ-alumina, α-alumina, etc.; alumina monohydrate ($Al_2O_3 \cdot H_2O$) such as boehmite, diaspore, etc.; aluminium hydroxide [$Al(OH)_3$] such as gypsite, bayerite, etc.; aluminium carbonate [$Al_2(CO_3)_2$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminium magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminium silicate ($Al_2SiO_5$, $Al_4 \cdot 3SiO_4 \cdot 5H_2O$, etc.), magnesium silicate ($Mg_2SiO_4$, $MgSiO_3$, etc.), calcium silicate ($Ca_2 \cdot SiO_4$, etc.), aluminium calcium silicate ($Al_2O_3 \cdot CaO \cdot 2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$]; as well as crystalline aluminosilicate salts containing a charge-correcting hydrogen, alkali metal or alkaline earth metal such as various types of zeolite. Preferably, $M^1$ in the general formula (XI) is at least one selected from aluminium metal, aluminium oxide or hydroxide, and their hydrates, or aluminium carbonate.

One or more different types of the inorganic compounds of the general formula (XI) may be used here either singly or as combined. The mean particle size of the inorganic compound is preferably within a range of from 0.01 to 10 µm from the viewpoint of the balance of kneading workability, abrasion resistance and wet grip performance, and more preferably within a range of from 0.05 to 5 µm.

As the inorganic filler (B) in the present invention, silica alone may be used, or silica as combined with at least one inorganic compound of the general formula (III) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area ($N_2SA$, as measured according to JIS K 6217-2:2001) of such carbon black is from 30 to 250 $m^2/g$. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of enhancing the low-heat-generation property. Further, the amount is more preferably from 30 to 100 parts by mass.

Also preferably, the filler in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of enhancing the low-heat-generation property.

In the filler, preferably, the amount of the inorganic filler (B) is 40% by mass or more from the viewpoint of satisfying both wet performance and low-heat-generation property, more preferably 70% by mass or more.

In the rubber composition production method of the present invention, various additives that are generally incorporated in a rubber composition, for example, a vulcanization activator such as zinc flower or the like, an antioxidant and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, etc.

EXAMPLES

The present invention is described in more detail with reference to the following Examples; however, the present invention is not limited at all by the following Examples.

Heat-generation property (tan δ index) and abrasion resistance as well as the bound styrene content (% by mass) in SBR, the vinyl bond content (%) in the conjugated diene moiety of SBR and the cis-1,4-bond content (%) in BR were measured and evaluated according to the following methods.

Heat-Generation Property (tan δ Index)

Using a viscoelasticity measuring device (by Rheometric), tan δ of the rubber composition sample was measured at a temperature of 60° C., at a dynamic strain of 5% and at a frequency of 15 Hz. Based on the tan δ in Comparative Example 3, 5, 7 or 9, as referred to 100, the data were expressed as index indication according to the following formula. The samples having a smaller index value have a better low-heat-generation property and have a smaller hysteresis loss.

Heat-Generation Index={(tan δ of vulcanized rubber composition tested)/(tan δ of vulcanized rubber composition of Comparative Example 16, 20, 24 or 28)}×100

Abrasion Resistance (Index)

According to JIS K 6264-2:2005 and using a Lambourn abrasion tester, the depth of wear was measured at 23° C. Based on the reciprocal of the depth of wear in Comparative Example 3, 5, 7 or 9, as referred to 100, the data were expressed as index indication according to the following formula. The samples having a larger index value have a smaller depth of wear and have better abrasion resistance.

Abrasion Resistance Index={(depth of wear of vulcanized rubber composition of Comparative Example 16, 20, 24 or 28)/(depth of wear of vulcanized rubber composition tested)}×100

Bound Styrene Content in SBR (% by Mass in Polymer)

Measured according to 270 MHz $^1$H-NMR. Vinyl Bond content in Conjugated Diene Moiety of SBR (% relative to whole diene moiety)

Measured according to 270 MHz $^1$H-NMR.

Cis-1,4-bond Content (%) in BR

Using a Fourier transform infrared spectrophotometer (trade name "FT/IR-4100", by Nippon Bunko), the cis-1,4-bond content (%) in polybutadiene was measured according to Fourier transform infrared spectroscopy described in JP-A 2005-015590.

Various modifying agents as mentioned below were used here.

As the modifying agent A (tetramethoxysilane), the modifying agent B (N-(1,3-dimethylbutylidene)-3-(triethoxysilyl)-1-propanamine, Chisso's "Sila-Ace S340"), the modifying agent I or N (2-cyanopyridine), the modifying agent J (1,3-dimethyl-2-imidazolidinone), the modifying agent K (1-methyl-2-pyrrolidone), the modifying agent Q (4-hexamethyleneiminoalkylstyrene) and hexamethyleneimine, used were commercial products or chemical reagents.

The modifying agents C, D and F are the modifying agents H, i and E described in JP-A 2010-270212.

The modifying agent E is the modifying agent 2 represented by the formula M2 described in JP-T 2009-512762

The modifying agents G, O and P are 3,4-bis(trimethylsilyloxy)benzaldehyde described as Example 21 in WO2009/086490.

The modifying agent H is N,N-bis(trimethylsilyl)-(3-amino-1-propyl)(methyl)(dichloro)silane described in JP-T 2010-530464.

The modifying agent L is hexamethyleneimine to be the amide moiety of lithium hexamethyleneimide, and in anionic polymerization, lithium hexamethyleneimide was used as polymerization initiator.

Chemical formulae of the modifying agents C, D, E, F and H are shown below. In the formulae, TMS is a trimethylsilyl group, Me is a methyl group and OEt is an ethoxy group.

[Chem. 11]

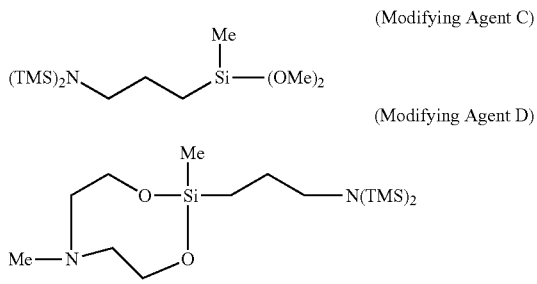

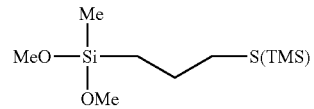

(Modifying Agent E)

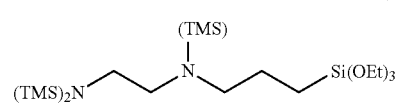

(Modifying Agent F)

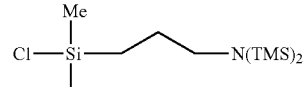

(Modifying Agent H)

<Production of Modified Anionically-Polymerized SBR-A to M>

A cyclohexane solution of 1,3-butadiene and a cyclohexane solution of styrene were put into a dried, nitrogen-purged, pressure-tight glass container having a volume of 800 mL, in such a manner that the amount of 1,3-butadiene therein could be 60 g and that of styrene could be 15 g. With that, 0.70 mmol of 2,2-ditetrahydrofurylpropane and 0.70 mmol of n-butyllithium were added thereto and then polymerized in a hot water bath at 50° C. for 1.5 hours thereby giving a styrene-butadiene copolymer having a lithium-type active site at the terminal. The polymerization conversion ratio was almost 100%. Subsequently, 2 mL of an isopropanol 5 mass % solution of an antioxidant 2,6-di-t-butyl-4-cresol (BHT) was added thereto at 50° C. to stop the polymerization, and further the reaction mixture was reprecipitated in isopropanol containing a small amount of BHT, and then dried in a drum drier to give a non-modified anionically-polymerized SBR. The bound styrene amount was 20% by mass, and the vinyl bond content in butadiene was 55%.

To the polymerization system in which the polymerization conversion ratio of the lithium-type active site-terminated styrene-butadiene copolymer reached almost 100% in polymerization to give the non-modified anionically-polymerized SBR, any of the above-mentioned modifying agents A to K was added in an amount of 0.63 mmol to modify the polymer at 50° C. for 30 minutes, and thereafter the system was processed in the same manner as in the above to give a modified anionically-polymerized SBR-A to K In polymerization to give the non-modified anionically-polymerized SBR, 0.70 mmol of lithium hexamethyleneimide was used in place of 0.70 mmol of n-butyllithium thereby giving a modified anionically-polymerized SBR-L where the modifying agent L was used.

Similarly, in polymerization to give the non-modified anionically-polymerized SBR, 0.70 mmol of lithium hexamethyleneimide was used in place of 0.70 mmol of n-butyllithium, and 0.63 mmol of the modifying agent B was added to the polymerization system where the polymerization conversion ratio reached almost 100%, to modify the polymer at 50° C. for 30 minutes thereby giving a modified anionically-polymerized SBR-M.

The bound styrene amount (% by mass) in the modified anionically-polymerized SBR-A to M and the vinyl bond content (%) in butadiene are shown in Table 1.

TABLE 1

| | Type of Non-modified/Modified Anionically-Polymerized SBR | | | | | | | | | | | | | |
|---|---|---|---|---|---|---|---|---|---|---|---|---|---|---|
| | A | B | C | D | E | F | G | H | I | J | K | L | M | Non-modified |
| Bound Styrene Amount (% by mass) | 20 | 21 | 19 | 20 | 20 | 19 | 20 | 21 | 21 | 20 | 20 | 20 | 19 | 20 |
| Vinyl Bond content in Butadiene (%) | 54 | 55 | 53 | 55 | 56 | 55 | 55 | 54 | 55 | 55 | 56 | 55 | 56 | 55 |

<Production of Modified Coordination-Polymerized BR—N and O>

7.11 g of a cyclohexane solution of butadiene (15.2% by mass), 0.59 mL of a cyclohexane solution of neodymium neodecanoate (0.56 mol/L), 10.32 mL of a toluene solution of methylaluminoxane MAO (Tosoh Akzo's PMAO) (3.23 mol as aluminium concentration), and 7.77 mL of a hexane solution of diisobutylaluminium hydride (by Kanto Chemical) 0.90 mol/L) were, in that order, put into a dried, nitrogen-purged, 100-mL glass bottle with a rubber stopper, and ripened at room temperature for 2 minutes, and then 1.45 mL of a hexane solution of diethylaluminium chloride (by Kanto Chemical) (0.95 mol/L) was added thereto and ripened for 15 minutes at room temperature with intermittently stirring. The neodymium concentration in the thus-obtained catalyst solution was 0.011 mol/L.

Next, a glass bottle with a rubber stopper, having a volume of about 1 L, was dried and purged with nitrogen, and a cyclohexane solution of dried and purified butadiene and dry cyclohexane were put thereinto to provide a condition where 400 g of a cyclohexane solution of 12.0 mass % butadiene was kept in the bottle.

Next, 1.56 mL (0.017 mmol as neodymium) of the previously-prepared catalyst A was put into the above, and the polymerization was carried out in a water bath at 50° C. for 1.5 hours. Subsequently, 2 mL of an isopropanol 5 mass % solution of an antioxidant 2,6-di-t-butyl-4-cresol (BHT) was added thereto at 50° C. to stop the polymerization, and further the reaction mixture was reprecipitated in isopropanol containing a small amount of BHT, and then dried in a drum drier to give a non-modified coordination-polymerized BR at a yield of almost 100%. The cis-1,4-bond content was 90% or more.

After polymerization for 1.5 hours in a water bath at 50° C. to give the non-modified coordination-polymerized BR, the modifying agent N or O was added to the polymer in an amount of 25 equivalents relative to neodymium, and reacted in the water bath at 50° C. for 1 hour. Subsequently, this was processed in the same manner as that for the non-modified coordination-polymerized BR to give a modified coordination-polymerized BR—N and O. The cis-1,4-bond content was 90% or more.

<Production of Modified Emulsion-Polymerized SBR-P and Q>

200 parts of water, 3 parts of rosin acid soap, 71 parts of 1,3-butadiene and 26 parts of styrene as monomers, 3 parts of the modifying agent P or Q and 0.2 parts of a chain transfer agent t-dodecylmercaptan were put into a polymerization reactor equipped with a stirrer. At a reaction temperature of 5° C., as a radical initiator, 0.1 parts of cumene hydroperoxide, 0.2 parts of sodium formaldehyde sulfoxide and 0.01 parts of ferric sulfate were added and the polymerization was started.

At the time when the conversion reached 60%, diethylhydroxylamine was added and the reaction was stopped. Next, the unreacted monomer was recovered through steam distillation, the copolymer was solidified with sulfuric acid and common salt, then washed with water and dried under reduced pressure to give a modified emulsion-polymerized SBR-P and Q. The bound styrene content was 23.5% by mass, and the amount of the modifying agent P or Q in the modified emulsion-polymerized SBR-P and Q was 3% by mass each.

Examples 1 to 19, and Comparative Examples 1 to 28

According to the formulation and the kneading method shown in Table 2, the components were mixed in a Banbury mixer in such a manner that the highest temperature of the rubber composition in the first stage of kneading (kneading time: 3 minutes) could be 150° C. except in Comparative Example 2, thereby preparing 46 types of rubber compositions. The highest temperature of the rubber composition in the first stage of kneading (kneading time: 6 minutes) in Comparative Example 2 was 180° C. In the first stage of kneading of the rubber compositions 1, 3, 5 and, 7 shown in Table 2, the rubber component (A), all of the inorganic filler (B) and the silane coupling agent (C) were kneaded, and after 60 seconds, the promoter (D) 1,3-diphenylguanidine, a type of guanidine was added thereto and further kneaded. On the other hand, in the first stage of kneading of the rubber compositions 2,4,6 and 8 in Table 2, the promoter (D) was not added. Thus obtained, 47 types of rubber compositions were evaluated in point of the heat-generation property (tan δ index) and the abrasion resistance, according to the above-mentioned methods. The results are shown in Tables 3 to 10.

TABLE 2

| | | | part by mass | Composition Number | | | | | | | |
|---|---|---|---|---|---|---|---|---|---|---|---|
| | | | | 1 | 2 | 3 | 4 | 5 | 6 | 7 | 8 |
| Formulation | First Stage of Kneading | | Conjugated Diene-based Polymer *1 | 100 | 100 | 100 | 100 | 50 | 50 | 100 | 100 |
| | | | Polyisoprene Rubber *2 | — | — | — | — | 50 | 50 | — | — |
| | | | Carbon Black N220 *3 | 5 | 5 | 15 | 15 | 20 | 20 | 30 | 30 |
| | | | Silica *4 | 60 | 60 | 50 | 50 | 50 | 50 | 35 | 35 |
| | | | Silane Coupling Agent Si75 *5 | 4.8 | 4.8 | 4.0 | 4.0 | 4.0 | 4.0 | 2.4 | 2.4 |

TABLE 2-continued

|  | part by mass | Composition Number | | | | | | | |
|---|---|---|---|---|---|---|---|---|---|
|  |  | 1 | 2 | 3 | 4 | 5 | 6 | 7 | 8 |
| Final Stage of Kneading | Aromatic Oil | 10 | 10 | 10 | 10 | 15 | 15 | 10 | 10 |
|  | Stearic Acid | — | 2.0 | — | 2.0 | — | 2.0 | — | 2.0 |
|  | Antioxidant 6PPD *6 | 1.0 | 1.0 | 1.0 | 1.0 | 1.0 | 1.0 | 1.0 | 1.0 |
|  | 1,3-Diphenylguanidine *7 | 1.0 | — | 1.0 | — | 1.0 | — | 1.0 | — |
|  | Stearic Acid | 2.0 | — | 2.0 | — | 2.0 | — | 2.0 | — |
|  | Antioxidant TMDQ *8 | 1.0 | 1.0 | 1.0 | 1.0 | 1.0 | 1.0 | 1.0 | 1.0 |
|  | Zinc Flower | 2.5 | 2.5 | 2.5 | 2.5 | 2.5 | 2.5 | 2.5 | 2.5 |
|  | 1,3-Diphenylguanidine *7 | 0.6 | 0.6 | 0.6 | 0.6 | 0.6 | 0.6 | 0.6 | 0.6 |
|  | Vulcanization Accelerator MBTS *9 | 1.0 | 1.0 | 1.0 | 1.0 | 1.0 | 1.0 | 1.0 | 1.0 |
|  | Vulcanization Accelerator TBBS *10 | 0.6 | 0.6 | 0.6 | 0.6 | 0.6 | 0.6 | 0.6 | 0.6 |
|  | Sulfur | 1.5 | 1.5 | 1.5 | 1.5 | 1.5 | 1.5 | 1.5 | 1.5 |
| Molar Amount of Organic Acid in First Stage of Kneading [$\times 10^{-3}$ mol] | | — | 26.8 | — | 26.8 | — | 26.8 | — | 26.8 |
| Molar Amount of Guanidine in First Stage of Kneading [$\times 10^{-3}$ mol] | | 4.7 | — | 4.7 | — | 4.7 | — | 4.7 | — |
| Molar Amount of Silane Coupling Agent in First Stage of Kneading [$\times 10^{-3}$ mol] | | 9.8 | 9.8 | 8.2 | 8.2 | 8.2 | 8.2 | 4.9 | 4.9 |

[Notes]
*1: Modified anionically-polymerized SBR-A to K modified anionically-polymerized SBR-A to M (Examples 1 to 15, Comparative Examples 3 to 15, and 18, 19), non-modified anionically-polymerized SBR (Comparative Examples 1, 2, 16, 17 and 20), modified coordination-polymerized BR-N and O (Examples 16, 17, Comparative Examples 22, 23), non-modified coordination-polymerized BR (Comparative Examples 21, 24), modified emulsion-polymerized SBR-P and Q (Examples 18, 19), and non-modified emulsion-polymerized SBR (Comparative Examples 25, 28)
*2: JSR's trade name "IR2200"
*3: Asahi Carbon's trade name "#80"
*4: Tosoh Silica's Nipsil AQ, having BET surface area of 220 $m^2/g$
*5: Bis(3-triethoxysilylpropyl) disulfide (mean sulfur chain length: 2.35), Evonik's silane coupling agent, trade name "Si75" (registered trademark)
*6: N-(1,3-dimehtylbutyl)-N'-phenyl-p-phenylenediamine, Ouchi Shinko Chemical Industry's trade name "Noclac 6C"
*7: 1,3-Diphenylguanidine, Sanshin Chemical Industry's trade name "Sanceler D"
*8: 2,2,4-Trimethyl-1,2-dihydroquinoline polymer, Ouchi Shinko Chemical Industry's trade name "Noclac 224"
*9: Di-2-benzothiazolyl disulfide, Sanshin Chemical Industry's trade name "Sanceler DM"
*10: N-tert-butyl-2-benzothiazolylsulfenamide, Sanshin Chemical Industry's trade name "Sanceler NS"

TABLE 3

|  |  | Example | | | | | | | | | | | | | Comparative Example | |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 1 | 2 |
| Modifying Agent used for Conjugated Diene-based Polymer | | A | B | C | D | E | F | G | H | I | J | K | L | M | Non-modified | Non-modified |
| Vulcanized Rubber Properties of Composition No. 1 | Heat-Generation Property | 85 | 79 | 77 | 73 | 83 | 72 | 79 | 77 | 86 | 87 | 89 | 88 | 77 | 95 | 92 |
|  | Abrasion Resistance | 114 | 121 | 122 | 125 | 117 | 127 | 121 | 123 | 116 | 112 | 113 | 113 | 122 | 104 | 107 |

Note)
Kneading time in the first stage of kneading: 3 minutes in Examples 1 to 13 and Comparative Example 1, and 6 minutes in Comparative Example 2.

TABLE 4

|  |  | Comparative Example | | | | | | | | | | | | | |
|---|---|---|---|---|---|---|---|---|---|---|---|---|---|---|
|  |  | 3 | 4 | 5 | 6 | 7 | 8 | 9 | 10 | 11 | 12 | 13 | 14 | 15 | 16 |
| Modifying Agent used for Conjugated Diene-based Polymer | | A | B | C | D | E | F | G | H | I | J | K | L | M | Non-modified |
| Vulcanized Rubber Properties of Composition No. 2 | Heat-Generation Property | 95 | 90 | 87 | 85 | 92 | 84 | 88 | 87 | 94 | 97 | 97 | 96 | 87 | 100 |
|  | Abrasion Resistance | 104 | 110 | 112 | 113 | 108 | 115 | 110 | 111 | 105 | 102 | 103 | 103 | 113 | 100 |

TABLE 5

|  |  | Example | | Comparative |
|---|---|---|---|---|
|  |  | 14 | 15 | Example 17 |
| Modifying Agent used for Conjugated Diene-based Polymer | | A | F | Non-modified |
| Vulcanized Rubber Properties of Composition No. 7 | Heat-Generation Property | 90 | 72 | 97 |
| | Abrasion Resistance | 108 | 130 | 104 |

TABLE 6

|  |  | Comparative Example | | |
|---|---|---|---|---|
|  |  | 18 | 19 | 20 |
| Modifying Agent used for Conjugated Diene-based Polymer | | A | F | Non-modified |
| Vulcanized Rubber Properties of Composition No. 8 | Heat-Generation Property | 97 | 84 | 100 |
| | Abrasion Resistance | 101 | 114 | 100 |

TABLE 7

|  |  | Example | | Comparative |
|---|---|---|---|---|
|  |  | 16 | 17 | Example 21 |
| Modifying Agent used for Conjugated Diene-based Polymer | | N | O | Non-modified |
| Vulcanized Rubber Properties of Composition No. 3 | Heat-Generation Property | 85 | 87 | 95 |
| | Abrasion Resistance | 115 | 114 | 104 |

TABLE 8

|  |  | Comparative Example | | |
|---|---|---|---|---|
|  |  | 22 | 23 | 24 |
| Modifying Agent used for Conjugated Diene-based Polymer | | N | O | Non-modified |
| Vulcanized Rubber Properties of Composition No. 4 | Heat-Generation Property | 94 | 95 | 100 |
| | Abrasion Resistance | 103 | 105 | 100 |

TABLE 9

|  |  | Example | | Comparative |
|---|---|---|---|---|
|  |  | 18 | 19 | Example 25 |
| Modifying Agent used for Conjugated Diene-based Polymer | | P | Q | Non-modified |
| Vulcanized Rubber Properties of Composition No. 5 | Heat-Generation Property | 88 | 87 | 97 |
| | Abrasion Resistance | 116 | 114 | 102 |

TABLE 10

|  |  | Comparative Example | | |
|---|---|---|---|---|
|  |  | 26 | 27 | 28 |
| Modifying Agent used for Conjugated Diene-based Polymer | | P | Q | Non-modified |

TABLE 10-continued

|  |  | Comparative Example | | |
|---|---|---|---|---|
|  |  | 26 | 27 | 28 |
| Vulcanized Rubber Properties of Composition No. 6 | Heat-Generation Property | 95 | 97 | 100 |
| | Abrasion Resistance | 106 | 105 | 100 |

As obvious from Table 3 to Table 10, the rubber compositions of Examples 1 to 19 all have low heat generation (tan δ index) and have improved abrasion resistance as compared with the comparative rubber compositions of Comparative Examples 1 to 28.

INDUSTRIAL APPLICABILITY

The rubber composition production method of the present invention is for producing a rubber composition containing a specific modified conjugated diene-based polymer, wherein the activity of the coupling function of the silane coupling agent can be further enhanced and a rubber composition excellent in low-heat-generation property and abrasion resistance can be obtained. Accordingly, the production method is favorable for production of constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:

1. A method for producing a rubber composition containing a rubber component (A) that contains a modified conjugated diene-based polymer obtained by using a modifying agent that has a functional group compatible with silica, a filler containing an inorganic filler (B), a silane coupling agent (C), and at least one promoter (D) selected from guanidines, sulfenamides, thiazoles, thiurams, thioureas, dithiocarbamic acid compounds and xanthogenic acid compounds, wherein the rubber composition is kneaded in plural stages, and in the first stage (X) of kneading, the rubber component (A), all or a part of the inorganic filler (B), all or a part of the silane coupling agent (C) and the promoter (D) are added, wherein the molar amount of the promoter (D) is front 0.1 to 1.0 times the molar amount of the silane coupling agent (C), and kneaded, and in the final stage of kneading, a vulcanizing agent and a vulcanization accelerator are added and kneaded.

2. The method for producing a rubber composition according to claim 1, wherein in the first stage, after the rubber component (A), all or a part of the inorganic filler (B) and all or a part of the silane coupling agent (C) are kneaded, the promoter (D) is added and further kneaded.

3. The method for producing a rubber composition according to claim 1, wherein the molar amount X of an organic acid in the rubber composition in the first stage satisfies the following relational formula [1] relative to the molar amount Y of the promoter (D):

$$0 \leq X \leq 1.5 \times Y \quad [1].$$

4. The method for producing a rubber composition according to claim 3, wherein the organic acid in the rubber composition is added in a second stage of kneading, wherein the second stage is an intermediate stage of kneading between the first and final stages of kneading, or after the intermediate stage of kneading.

5. The method for producing a rubber composition according to claim 1, wherein the highest temperature of the rubber composition in the first stage is from 120 to 190° C.

6. The method for producing a rubber composition according to claim 1, wherein the silane coupling agent (C) is one or more compound selected from a group consisting of the compounds of the following general formulae (I) and (II):

[Chem. 1]

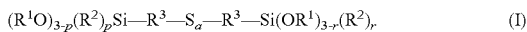

(R$^1$O)$_{3-p}$(R$^2$)$_p$Si—R$^3$—S$_a$—R$^3$—Si(OR$^1$)$_{3-r}$(R$^2$)$_r$  (I)

wherein plural R$^1$'s may be the same or different, each representing a linear, cyclic or branched alkyl group, having from 1 to 8 carbon atoms, or a linear or branched alkoxylalkyl group, having from 2 to 8 carbon atoms; plural R$^2$'s may be the same or different, each representing a linear, cyclic or branched alkyl group, having from 1 to 8 carbon atoms; plural R$^3$'s may be the same or different, each representing a linear or branched alkylene group, having from 1 to 8 carbon atoms; a indicates from 2 to 6 as a mean value; p and r may be the same or different, each indicating from 0 to 3 as a mean value, provided that both p and r are not 3 at the same time;

[Chem. 2]

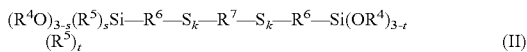

(R$^4$O)$_{3-s}$(R$^5$)$_s$Si—R$^6$—S$_k$—R$^7$—S$_k$—R$^6$—Si(OR$^4$)$_{3-t}$(R$^5$)$_t$  (II)

wherein plural R$^4$'s may be the same or different, each representing a linear, cyclic or branched alkyl group, having from 1 to 8 carbon atoms, or a linear or branched alkoxylalkyl group, having from 2 to 8 carbon atoms; plural R$^5$'s may be the same or different, each representing a linear, cyclic or branched alkyl group, having from 1 to 8 carbon atoms; plural R$^6$'s may be the same or different, each representing a linear or branched alkylene group, having from 1 to 8 carbon atoms; R$^7$ represents a divalent group of a general formula (—S—R$^8$—S—), (—R$^9$—S$_{m1}$—R$^{10}$—) or (—R$^{11}$—S$_{m2}$—R$^{12}$—S$_{m3}$—R$^{13}$—) (where R$^8$ to R$^{13}$ may be the same or different, each representing a divalent aliphatic or alicyclic hydrocarbon group, having from 1 to 20 carbon atoms, a divalent aromatic group, or a divalent organic group containing a hetero element except sulfur and oxygen; m1, m2 and m3 may be the same or different, each indicating from 1 to less than 4 as a mean value); plural k's may be the same or different, each indicating from 1 to 6 as a mean value; s and t may be the same or different, each indicating from 0 to 3 as a mean value, provided that both s and t are not 3 at the same time.

7. The method for producing a rubber composition according to claim 6, wherein the silane coupling agent (C) is a compound represented by the general formula (I).

8. The method for producing a rubber composition according to claim 1, wherein the inorganic filler (B) is silica.

9. The method for producing a rubber composition according to claim 1, wherein the filler contains carbon black.

10. The method for producing a rubber composition according to claim 1, wherein the inorganic filler (B) is in an amount of 40% by mass or more based on the total amount of filler.

11. The method for producing a rubber composition according to claim 1, wherein the guanidine is at least one compound selected from the group consisting of 1,3-diphenylguanidine, 1,3-di-o-tolylguanidine and 1-o-tolylbiguanide.

12. The method for producing a rubber composition according to claim 1, wherein the sulfenamide is at least one compound selected from the group consisting of N-cyclohexyl-2-benzothiazolylsulfenamide and/or N-tert-butyl-2-benzothiazolylsulfenamide.

13. The method for producing a rubber composition according to claim 1, wherein the thiazole is at least one compound selected from the group consisting of 2-mercaptobenzothiazole and/or di-2-benzothiazolyl disulfide.

14. The method for producing a rubber composition according to claim 1, wherein the thiuram is at least one compound selected from the group consisting of tetrakis(2-ethylhexyl)thiuram disulfide and tetrabenzylthiuram disulfide.

15. The method for producing a rubber composition according to claim 1, wherein the thiourea is at least one compound selected from the group consisting of N,N'-diethylthiourea, trimethylthiourea, N,N'-diphenylthiourea and N,N'-dimethylthiourea.

16. The method for producing a rubber composition according to claim 1, wherein the dithiocarbamic acid compound is at least one compound selected from the group consisting of zinc dibenzyldithiocarbamate, zinc N-ethyl-N-phenyldithiocarbamate, zinc dimethyldithiocarbamate and copper dimethyldithiocarbamate.

17. The method for producing a rubber composition according to claim 1, wherein the xanthogenic acid compound is zinc isopropylxanthate.

18. The method for producing a rubber composition according to claim 3, wherein stearic acid accounts for 50 mol % or more of the organic acid.

19. The method for producing a rubber composition according to claim 1, wherein the modifying agent is a modifying agent having at least one atom selected from the group consisting of a silicon atom, a nitrogen atom and an oxygen atom.

20. The method for producing a rubber composition according to claim 1, wherein the modifying agent is a hydrocarbyloxysilane compound.

21. The method for producing a rubber composition according to claim 20, wherein the hydrocarbyloxysilane compound is a hydrocarbyloxysilane compound represented by the following general formula (III):

[Chem. 3]

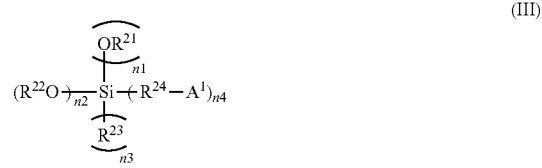

(III)

wherein n1+n2+n3+n4=4 (where n2 is an integer of from 1 to 4, and n1, n3 and n4 each are an integer of from 0 to 3); A$^1$ represents at least one functional group selected from a saturated cyclic tertiary amine compound residue, an unsaturated cyclic tertiary amine compound residue, a ketimine residue, a nitrile group, a (thio)isocyanate group, a (thio)epoxy group, a trihydrocarbyl isocyanurate group, a dihydrocarbyl carbonate group, a nitrile group, a pyridine group, a (thio)ketone group, a (thio)aldehyde group, an amide group, a (thio)carboxylate group, a (thio)carboxylate metal salt group, a carboxylic acid anhydride residue, a carboxylic acid halide residue, and a hydrolysable group-having, primary or secondary amino group or mercapto group; when n4 is 2 or more, then $A^1$'s may be the same or different, $A^1$ may bond to Si to be a divalent group that forms a cyclic structure; $R^{21}$ represents a monovalent aliphatic or alicyclic hydrocarbon group, having from 1 to 20 carbon atoms, or a monovalent aromatic hydrocarbon group having from 6 to 18 carbon atoms; when n1 is 2 or more, then $R^{21}$'s may be the same or different; $R^{23}$ represents a monovalent aliphatic or alicyclic hydrocarbon group, having from 1 to 20 carbon atoms, a monovalent aromatic hydrocarbon group having from 6 to 18 carbon atoms, or a halogen atom; when n3 is 2 or more, then $R^{23}$'s may be the same or different; $R^{22}$ represents a monovalent aliphatic or alicyclic hydrocarbon group, having from 1 to 20 carbon atoms or a monovalent aromatic hydrocarbon group having from 6 to 18 carbon atoms, optionally having a nitrogen atom and/or a silicon atom; when n2 is 2 or more, then $R^{22}$'s may be the same or different, or may bond to each other to form a ring; $R^{24}$ represents a divalent aliphatic or alicyclic hydrocarbon group, having from 1 to 20 carbon atoms, or a divalent aromatic hydrocarbon group having from 6 to 18 carbon atoms; when n4 is 2 or more, then $R^{24}$'s may be the same or different.

22. The method for producing a rubber composition according to claim 21, wherein the hydrocarbyloxysilane compound is a hydrocarbyloxysilane compound represented by the following general formula (IV):

[Chem. 4]

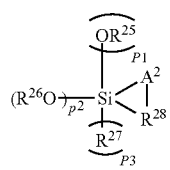

(IV)

wherein p1+p2+p3=2 (where p2 is an integer of from 1 to 2, and p1 and p3 each are an integer of from 0 to 1); $A^2$ represents $NR^a$ (where $R^a$ represents a monovalent hydrocarbon group, a hydrolysable group or a nitrogen-containing organic group), or a sulfur; $R^{25}$ represents a monovalent aliphatic or alicyclic hydrocarbon group, having from 1 to 20 carbon atoms, or a monovalent aromatic hydrocarbon group having from 6 to 18 carbon atoms; $R^{27}$ represents a monovalent aliphatic or alicyclic hydrocarbon group, having from 1 to 20 carbon atoms, a monovalent aromatic hydrocarbon group having from 6 to 18 carbon atoms, or a halogen atom; $R^{26}$ represents a monovalent aliphatic or alicyclic hydrocarbon group, having from 1 to 20 carbon atoms or a monovalent aromatic hydrocarbon group having from 6 to 18 carbon atoms, optionally having a nitrogen atom and/or a silicon atom; when p2 is 2, then $R^{26}$'s may be the same or different, or may bond to each other to form a ring; $R^{28}$ represents a divalent aliphatic or alicyclic hydrocarbon group, having from 1 to 20 carbon atoms, or a divalent aromatic hydrocarbon group having from 6 to 18 carbon atoms.

23. The method for producing a rubber composition according to claim 21, wherein the hydrocarbyloxysilane compound is a hydrocarbyloxysilane compound represented by the following general formula (V) or (VI):

[Chem. 5]

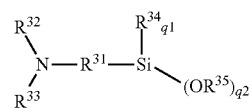

(V)

wherein q1+q2=3 (where q1 is an integer of from 0 to 2, and q2 is an integer of from 1 to 3); $R^{31}$ represents a divalent aliphatic or alicyclic hydrocarbon group, having from 1 to 20 carbon atoms, or a divalent aromatic hydrocarbon group having from 6 to 18 carbon atoms; $R^{32}$ and $R^{33}$ each independently represent a hydrolysable group, a monovalent aliphatic or alicyclic hydrocarbon group, having from 1 to 20 carbon atoms, or a monovalent aromatic hydrocarbon group having from 6 to 18 carbon atoms; $R^{34}$ represents a monovalent aliphatic or alicyclic hydrocarbon group, having from 1 to 20 carbon atoms, or a monovalent aromatic hydrocarbon group having from 6 to 18 carbon atoms; when q1 is 2, then $R^{34}$'s may be the same or different; $R^{35}$ represents a monovalent aliphatic or alicyclic hydrocarbon group, having from 1 to 20 carbon atoms, or a monovalent aromatic hydrocarbon group having from 6 to 18 carbon atoms; when q2 is 2 or more, then $R^{35}$'s may be the same or different;

[Chem. 6]

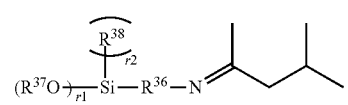

(VI)

wherein r1+r2=3 (where r1 is an integer of from 1 to 3, r2 is an integer of from 0 to 2); $R^{36}$ represents a divalent aliphatic or alicyclic hydrocarbon group, having from 1 to 20 carbon atoms, or a divalent aromatic hydrocarbon group having from 6 to 18 carbon atoms; $R^{37}$ represents a dimethylaminomethyl group, a dimethylaminoethyl group, a diethylaminomethyl group, a diethylaminoethyl group, a methylsilyl(methyl)aminomethyl group, a methylsilyl(methyl)aminoethyl group, a methylsilyl(ethyl)aminomethyl group, a methylsilyl(ethyl)aminoethyl group, a dimethylsilylaminomethyl group, a dimethylsilylaminoethyl group, a monovalent aliphatic or alicyclic hydrocarbon group, having from 1 to 20 carbon atoms, or a monovalent aromatic hydrocarbon group having from 6 to 18 carbon atoms; when r1 is 2 or more, then $R^{37}$'s may be the same or different; $R^{38}$ represents a hydrocarbyloxy group having from 1 to 20 carbon atoms, a monovalent aliphatic or alicyclic hydrocarbon group, having from 1 to 20 carbon atoms, or a monovalent aromatic hydrocarbon group having from 6 to 18 carbon atoms; when r2 is 2, then $R^{38}$'s may be the same or different.

24. The method for producing a rubber composition according to claim 21, wherein the hydrolysable group is at least one group selected from the group consisting of a trimethylsilyl group and a t-butyldimethylsilyl group.

25. The method for producing a rubber composition according to claim 19, wherein the modifying agent is at least one compound selected from the group consisting of 3,4-bis(trimethylsilyloxy)benzaldehyde, 3,4-bis(tert-butyldimethylsilyloxy)benzaldehyde, 2-cyanopyridine, 1,3-dimethyl-2-imidazolidinone and 1-methyl-2-pyrrolidone.

26. The method for producing a rubber composition according to claim 19, wherein the modifying agent is the amide moiety of a lithium amide compound to be used as the polymerization initiator in anionic polymerization.

27. The method for producing a rubber composition according to claim 26, wherein the lithium amide compound is a compound selected from the group consisting of lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperadide, lithium ethylpropylamide, lithium ethylbutylamide, lithium ethylbenzylamide and lithium methylphenethylamide.

28. The method for producing a rubber composition according to claim 19, wherein the modifying agent is at least one compound selected from the group consisting of 2-cyanopyridine and 3,4-ditrimethylsilyloxybenzaldehyde.

29. The method for producing a rubber composition according to claim 19, wherein the modifying agent is at least one compound selected from the group consisting of 3,4-ditrimethylsilyloxybenzaldehyde and 4-hexamethyleneiminoalkylstyrene.

30. The method for producing a rubber composition according to claim 4, wherein stearic acid accounts for 50 mol % or more of the organic acid.

* * * * *